Jan. 12, 1937.                G. W. IMGRUND                2,067,608
RAILWAY BRAKE BOTTOM CONNECTING ROD GUARD
Filed Nov. 6, 1933
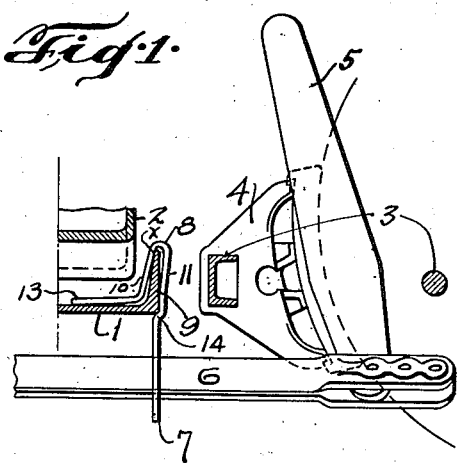
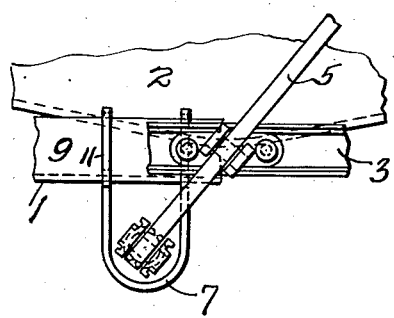
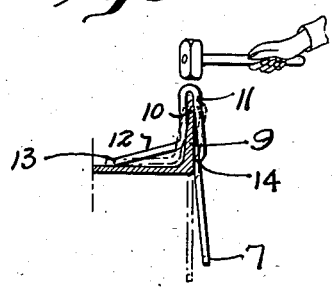
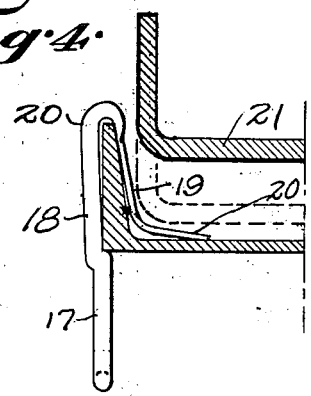
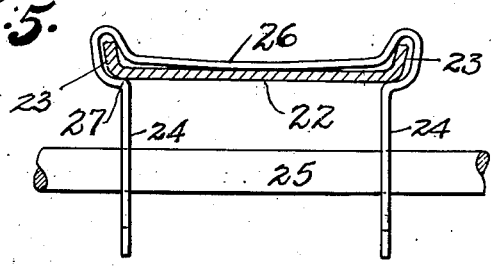
Inventor
George W. Imgrund
By Rodney Bedell
Attorney Patented Jan. 12, 1937

2,067,608

UNITED STATES PATENT OFFICE 2,067,608

RAILWAY BRAKE BOTTOM CONNECTING ROD GUARD

George W. Imgrund, Springfield, Ill.

Application November 6, 1933, Serial No. 696,754

13 Claims. (Cl. 188—210)

The invention relates to railway brake gear and consists in a novel device for guarding a brake beam bottom connecting rod suspended from or otherwise mounted on the truck structure.

The main object of the invention is to provide a simple, efficient device for the intended purpose which may be readily applied to and removed from the truck part upon which it is mounted and, preferably, without requiring any work to be done on that part.

In the accompanying drawing which illustrates the invention—

Figure 1 is a transverse section through one-half of the spring plank and bolster of a truck illustrating a portion of the adjacent wheel and brake rigging including the bottom connecting rod and a guard therefor.

Figure 2 is a front elevation of the same structure.

Figure 3 illustrates the application of the device to the spring plank.

Figure 4 illustrates a modification of the device shown in Figures 1 to 3.

Figure 5 illustrates another modification of the device particularly adapted for application to a pressed plate spring plank or other mounting structure having relatively narrow flanges.

In the construction shown in Figures 1, 2 and 3, the channel spring plank 1, the box-section bolster 2, the truss type brake beam 3, brake shoe 4, brake lever 5 and bottom connection 6 are of common construction and in themselves do not constitute the invention.

The bottom connection guard applied to the spring plank consists preferably of a flat bar bent to form a U-shaped member 7, the upper portion of each arm of which includes a downwardly facing hook 8 disposed to slip over the upwardly turned flange 9 of the channel spring plank. Each hook member includes legs 10 and 11 which in their normal position freely receive the spring plank flange between them and the upper end of the hook substantially clears the upper edge of the spring plank flange.

A lateral extension 12 on the lower end of arm 10 is inclined outwardly and downwardly therefrom so that only its extreme end 13 engages the web of the spring plank when the device is in position. Contact at X prevents movement of the device to the right.

Each upright arm of member 7 is offset at 14 to provide an upwardly facing shoulder adapted to engage the channel. The guard is of spring material and its normal shape is such that its legs are sprung between points 13 and 14 to yieldingly grip the spring plank and thereby securely hold the device in position against accidental movement without seriously interfering with the intentional removal of the device. As is apparent from Figure 3, the device may be applied to the spring plank readily and no drilling, bolting or riveting of the device to the spring plank is required nor is it necessary to provide any supplementary brackets on the spring plank.

The contour of elements 10 and 12 follows the contour of the upper face of the spring plank web and the inner face of the spring plank flange whereby the device accommodates the adjacent elements of the bolster 2 even though the safety device is positioned adjacent to the lowermost portion of the latter, i. e., near the transverse center line of the truck.

In the modification shown in Figure 4, the main body portion 17 of the device and the outer legs 18 of the hook members are formed by a bar of round cross section, the remainder of the bar being flattened to form the inner legs 19 and the lateral extensions 20. This flattening increases the flexibility of the device throughout that portion in which greater springiness is desired. This arrangement also increases the clearance between the device and the bolster 21 and better accommodates the downward movement of the latter when its supporting springs are compressed.

Figure 5 illustrates a modified form of the invention which is particularly adapted for application to a spring plank 22 of the pressed plate type having relatively short upstanding flanges 23. The device viewed from the side of the truck has a general inverted U appearance, the legs 24 of the U depending from opposite sides of the spring plank and forming spaced supports for the bottom connection 25, and the cross bar 26 of the U being bowed downwardly to contact with the upper face of the spring plank intermediate the flanges 23 and legs 24. Shoulders 27 on legs 24 engage the lower outer corners of the spring plank to cooperate with the bowed portion of the cross arm to hold the device in position. Since this device straddles the spring plank, the relative height of flanges 23 is immaterial and variations in the same will not affect the security of the mounting of the safety guard.

It will be understood that the device is not necessarily mounted upon the truck spring plank but may be applied to a bracket on the side frame having an angular contour similar to that of the spring planks illustrated, or any other suitable supporting part of the truck structure.

It has been suggested heretofore that devices of this general type could utilize the distortion occasioned by the spreading of similar hook legs only, to retain the device in position on the spring plank. Such spreading relies upon the springing of the metal throughout the very short distance of the return bend itself, producing a relatively high degree of distortion. By increasing the length of the distorted section it is possible to decrease the degree of distortion stress and at the same time increase the holding tension resulting from the distortion.

The contour of the device and other details may be varied otherwise than as shown and exclusive use of all modifications within the scope of the claims is contemplated.

I claim:

1. A railway brake bottom connecting rod guard including a downturned hook member arranged to slip over an upturned portion of a mounting member, there being a rod engageable element on one leg of the hook member and there being a lateral extension of substantial length on the other leg of the hook member for yieldingly engaging said mounting member at a point spaced from said hook member to hold said first-mentioned leg against said flange.

2. A railway brake bottom connecting rod guard including a downturned hook member, there being a lateral extension of substantial length on one of the legs of the hook member and there being a shoulder formed on the other leg of said hook member, said shoulder and the outer end of said lateral extension being arranged to cooperate to engage opposite sides of a mounting for the guard.

3. A railway brake bottom connecting rod guard including a downwardly opening hook member, the legs of which are provided with individual lateral elements on their lower portions, said elements projecting in the same general direction and being spaced apart longitudinally of the hook member to receive a truck part between them to secure the guard against accidental movement from the truck part.

4. A railway brake bottom connecting rod guard including a downturned hook member arranged to receive a projection on a truck part between its legs, one of said legs having an outward and downward extension and the other of said legs having a shoulder disposed to cooperate with said extension to engage a mounting for the guard, said latter-mentioned leg also including an extension for engaging the bottom rod.

5. A railway brake bottom connecting rod guard having a general U-shape, the upper portion of each of the arms of the U-shape terminating in a downwardly facing hook member disposed to slip over the upturned flange of a mounting for the guard, there being a lateral extension upon the lower outer end of each hook member for engaging one face of the mounting at a point spaced from the edge of the latter and there being a cooperating shoulder upon the other leg of each hook member for engaging another face of said mounting.

6. In a railway brake bottom connecting rod guard, a member of resilient material adapted to be sprung into place over a truck spring plank or like part for mounting the same, said member comprising a downturned hook with a lateral extension of substantial length on the lower portion of one leg having a terminal element disposed to engage an upturned portion of the mounting part at a point spaced from said hook, there being a projecting element on the other leg disposed to engage a downturned portion of said mounting part, said elements being on substantially the same level whereby the entire device between said elements forms a spring arm when the elements are spread to receive the mounting part between them.

7. A railway brake bottom connecting rod guard having an inverted U-shape arranged to receive a wide supporting member between its legs, the cross bar of the device being bowed to engage the upper face of said member intermediate said legs and said legs having upwardly facing shoulders for yieldingly engaging the lower edges of said member.

8. In combination, a truck part having a horizontal web and a flange extending upwardly therefrom, a downwardly opening hook member receiving said flange and the adjacent portion of said web, the lower portion of one leg of said hook member extending across said web and engaging the same at a point spaced from said flange thereby distorting said hook member and forcing the other leg thereof against the outer face of said flange, there being an upwardly facing extension on said latter-mentioned leg of said hook member, and a brake bottom connecting rod overlying said latter-mentioned extension.

9. In combination, a railway truck spring plank having an upturned flange, a brake bottom connecting rod guard including a downturned hook receiving said flange between its legs, there being a lateral extension on the lower portion of one of said legs engaging the upper face of said spring plank at a point spaced a substantial distance from said flange and there being a shoulder on the other leg of said hook member engaging the lower corner of said spring plank, said guard being of spring material and distorted from its normal contour to yieldingly grip said spring plank between said extension and shoulder, and an element projecting from the lower portion of said latter-mentioned leg to engage said bottom connecting rod.

10. In combination, a railway truck spring plank channel, a brake bottom connecting rod guard of elastic material with an element engaging the upper face of the web of said channel substantially midway between the latter's flanges and with another element engaging the lower outer corner of said channel, said guard intermediate said elements following generally the contour of said channel.

11. In a railway truck, a spring plank of channel cross section, a bolster having a lower contour substantially paralleling the upper contour of said spring plank, a portion of said bolster closely approaching said spring plank, and a brake bottom connecting rod guard overlying the upper face of the web and the inner face of the flange of said spring plank beneath said bolster and closely following the upper contour of said web and the inner contour of said flange to permit the close approach of said bolster and spring plank.

12. In a railway truck, a wide horizontally disposed member and a brake bottom connecting rod guard having a portion extending across the top of said member and having portions extending downwardly at each side thereof, said first-mentioned portion being bowed downwardly at its center to engage said member and said downwardly extending portions having upwardly facing shoulders for engaging the lower outer corners of said member, said guard being of resilient material whereby said shoulders and the center of said first-mentioned portion cooperate to yieldingly hold the guard in position on said member.

13. A safety device for car trucks comprising a bracket having an inverted U-shaped portion defining a substantially wedge-shaped seating recess adapted to receive an upstanding flange of a spring plank, one of the legs of the U-shaped portion being provided with an angularly disposed yielding flange to rest upon the top face of the horizontal web of a spring plank and the other leg thereof being extended downwardly to form a stirrup for receiving a brake rod and having an upwardly facing offset for engaging the bottom corner of a spring plank and preventing upward movement of the device out of engagement with a spring plank.

GEORGE W. IMGRUND.